United States Patent Office 3,749,726
Patented July 31, 1973

3,749,726
LINEAR ALKYL-AMIDO TRANS-QUINACRIDONE PIGMENTS
Otto Fuchs, Frankfurt am Main, and Ernst Spietschka, Oberauroff, Taunus, Germany, assignors to Farbwerke Hoechst Aktiengesellschaft vormals Meister Lucius & Bruning, Frankfurt am Main, Germany
No Drawing. Filed Dec. 3, 1970, Ser. No. 94,962
Claims priority, application Germany, Dec. 4, 1969,
P 19 60 896.9
Int. Cl. C07d 39/00
U.S. Cl. 260—279 R       5 Claims

ABSTRACT OF THE DISCLOSURE

Linear trans-quinacridones of the general formula

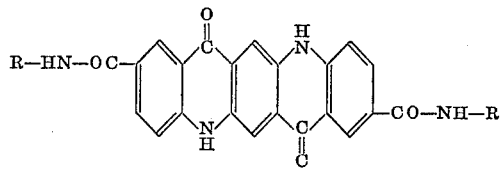

wherein R is a hydrogen atom or an alkyl group, preferably having 1 to 6 carbon atoms, except the ethyl, n-butyl and n-hexyl group and process for preparing them. Said pigments are *at least as* fast to light and weathering and are suitable for coloring printing inks, lacquers and plastics.

It is known that linear trans-quinacridones may be prepared by treating 2,5-diarylamino-terephthalic acids or their esters at elevated temperature with ring closing agents. As ring-closing agents there have been proposed, inter alia, boric acid, polyphosphoric acid, molten aluminium chloride, anhydrous hydrofluoric acid and also concentrated or diluted sulfuric acid (S. S. Labana and L. L. Labana, Chemical Reviews vol. 67 No. 1 (1967), pages 1–15). Among these agents it would certainly be preferable to use sulfuric acid for reasons of price, if it would be possible to prepare with sulfuric acid quinacridones, the properties of which correspond to the quinacridones which have become important in industry as very fast pigments. As such pigments there may be mentioned the unsubstituted quinacridone in its β-or γ-modification, the 2,9-dimethylquinacridone, the 3,10-dichloroquinacridone and the 2,9 - dimethyl - 3,10 - dichloroquinacridone.

The ring closure of these pigments in concentrated or diluted sulfuric acid is not satisfactory, since at the reaction temperatures at which the ring closure takes place, considerable sulfonation occurs and since the necessary subsequent desulfonation does not lead to products which may be used as pigments without complicated purification. On account of said reasons the sulfuric acid may not be used as cheapest ring closing agent, but it is necessary to have recourse to much dearer ring closing agents for preparing very fast quinacridones indispensable for the practice; particularly if, in the interest of a simple process for converting into an efficient pigment form, the crude quinacridone resulting from the ring closure reaction shall be obtained in extremely finely divided form as a moist press-cake. This is very important because it is very easy to convert this finely divided crude quinacridone, according to the processes described for example in German patent specification No. 1,261,106, into a pigment form eminently suitable for being used in all important fields of application for organic pigments.

It would certainly be a technical progress, if it would be possible to find pure bluish red or red violet pigments with high fastness properties, which may also be prepared by using sulfuric acid as ring closing agent.

It has now been found that such new pigments with very good fastness properties of the general formula

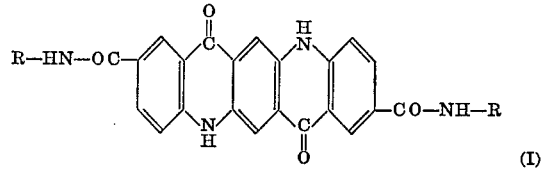

wherein R represents a hydrogen atom or an alkyl group, preferably having 1–6 carbon atoms, except the ethyl, n-butyl and n-hexyl group, may be obtained, when treating 2,5-diarylamino-terephthalic acids or their alkyl esters of the general formula

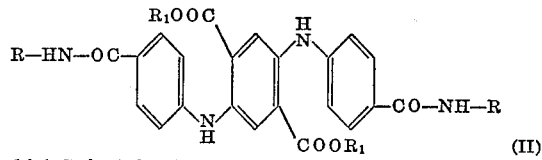

in which R is defined as above and $R_1$ stands for a hydrogen atom or an alkyl group having 1–4 carbon atoms, preferably a methyl or ethyl group, with ring-closing agents at elevated temperatures.

In the present process there is preferably used sulfuric acid as ring closing agent, expediently having a concentration between about 88 and 95%, preferably between about 92 and 94%. The reaction is expediently carried out by introducing the corresponding 2,5-diarylamino terephthalic acid derivative into 5 to 15 times the amount of sulfuric acid of said concentration and by heating slowly up to temperatures between 110° and 150° C., preferably 120–135° C. and by maintaining the whole at the chosen temperature, until a sample hydrolized with water does not show any trace of the starting material. The reaction mixture is then slowly poured onto ice, the precipitated red deposit is filtered and washed until neutral with diluted alkaline solution and then with water.

By this way, the linear quinacridones are obtained in a practically quantitative yield having a very pure and extremely finely divided form.

The use of sulfuric acid in different concentrations as ring closing agent is known. However, neither the unsubstituted quinacridone nor the substituted quinacridones hitherto known may be closed to a ring in sulfuric acid without getting by-products, since sulfonation is already observed under the reaction conditions and the sulfo groups introduced cannot easily split off. Thus, products sufficiently pure for being employed as pigments cannot be obtained. Therefore it was surprising that in the present invention not only the sulfonation was missing, but that also the carboxylic acid amide or carboxylic acid alkyl amide groups were not saponified.

In the process according to the invention other ring closing agents may also be employed, for example boric acid (H. Liebermann, Liebigs Annalen der Chemie 518 (1935), pages 245–259), anhydrous hydrofluoric acid (French patent specification No. 1,245,971), metal halides, especially aluminium chloride (French patent specification No. 1,253,985) and polyphosphoric acid (German patent specification No. 1,112,597).

The ring closure reaction, depending on the ring closing agent, is generally carried out at temperatures between about 100° and 250° C. With regard to the fact that the above ring closing agents are acidic and partly strongly acidic compounds, it was also surprising that the free or N-mono-substituted carbonamido groups, despite the relatively high ring closing temperatures, were not affected and crude quinacridones were obtained, which could be converted into a good pigment form without any complicated intermediate purification.

The starting compounds of the above Formula II employed in the present process may be prepared in analogous way as the known dianilinoterephthalic acid derivatives, for example by condensation of succinylosuccinic acid esters with p-amino-benzoic acid amides, subsequent oxidation and, if desired, saponification.

The quinacridones obtained in the above manner are very pure, but in the actual form they may generally not be used as pigments, since they do not yet possess the best physical form for pigments. The conversion of these products into a coloristically valuable pigment form is effected in known manner.

The conversion into this form may, for example, be carried out by heating for several hours the moist press-cake in water without additives or with addition of an appropriate solvent under pressure up to temperatures of 100–200° C., preferably of 120–180° C., by filtering after cooling to room temperature, by freeing the moist press-cake from the organic substance by washing or distillation with steam, by drying and, if desired, grinding in an appropriate grinding device (German patent specification No. 1,261,106).

When using solvents, the boiling point of which ranges above 100° C., the water may be distilled off at normal pressure up to the mentioned temperatures and worked up as described above.

As substances which cause the conversion into the best pigment form, there are considered the substances cited for example in the German patent specifications Nos. 1,196,619, 1,268,586 and 1,261,106; however, in the process according to the invention there may also be used hydrocarbons, their halogen and nitro substituted hydrocarbons and substances insoluble or sparingly soluble in water.

The conversion of the quinacridones obtained according to the invention into a coloristically valuable pigment form is preferably carried out according to the above mentioned processes, since it is possible in this case to start from the aqueous moist press-cake. The conversion may also be effected by grinding the dried product in the presence of water-soluble inorganic salts such as sodium chloride or sodium sulfate; small amounts of organic solvents are added, if desired (U.S. patent specification No. 2,821,530). It is also possible to grind the quinacridone in a roller type grinder and to knead the preliminarily ground product with 4 to 10 times the amount by weight of an organic solvent such as acetone, dimethylformamide or tetrachloroethylene (U.S. patent specification No. 2,857,400).

The new quinacridone pigments obtained according to the method described above are fine crystalline red powders which are eminently suitable for coloring printing inks, lacquers and plastics such as polyvinylchloride, and which may be advantageously used in all fields of application for pigments. The fastness properties of the new pigments according to the invention, especially the fastness to light and weathering are at least as good as in the case of the best quinacridones hitherto known, in some cases, they are even better.

The following examples serve to illustrate the invention. Parts and percentages are by weight unless stated otherwise.

EXAMPLE 1

30 parts of 2,5-di-(4'-carbonamido-phenylamino)-terephthalic acid were introduced while stirring into 300 parts of 94% sulfuric acid. The mixture was slowly heated to 135° C. and maintained at this temperature for one hour. After cooling, the whole was poured onto ice, stirred for a short time, the precipitated dark red deposit was filtered and washed until neutral. After extracting the crude product with diluted alkali, the filtered material, after washing again until neutral, was suspended in 300 parts of dimethylformamide, the suspension was slowly heated up to 140–150° C., the water being distilled off, and maintained for 5 hours at this temperature. It was filtered, the residue was washed with methanol or water, dried and ground. 27 parts of a crystal powder were obtained, with which pure red enamels could be prepared and which exhibited in all fields of application superior fastness properties.

When the percentage of the sulfuric acid was reduced to 92 or 90%, similar good results were obtained when heating was effected for some longer time. When the reaction was carried out at 115–120° C. in 94% sulfuric acid, the reaction time had to be raised to 3–4 hours.

The same results were obtained when the dimethylformamide was replaced by equal parts of N-methylacetamide, dimethylacetamide, N-methylpyrrolidone, butyrolactone, ε-caprolactam, dimethylsulfoxide, phenol, aniline, quinoline, benzoic acid methyl ester or nitrobenzene.

EXAMPLE 2

50 parts of 2,5-di-(4'-N-n-propyl-carbonamido-phenylamino) terephthalic acid were mixed with 500 parts of polyphosphoric acid having a content of about 84% of $P_2O_5$. The whole was slowly heated up to 125° C. and maintained for one hour at this temperature. After cooling it was hydrolyzed by pouring into ice water, the precipitated dark red deposit was filtered and washed with water until neutral. In order to remove any present starting material, the filtered material was boiled out with diluted alkali, filtered and washed until neutral. The conversion into the pigment form was effected according to the data of Example 1 or to the operation method described in the German patent specification No. 1,261,106.

44 parts of a red violet powder were obtained which showed when incorporated in polyvinyl chloride, a red violet shade and exhibited an excellent fastness to heat and bleeding.

When instead of the above mentioned free diarylaminoterephthalic acid, the equivalent amount of its methyl or ethyl ester was used, the desired product was also obtained in an excellent yield.

EXAMPLES 3–5

The following table lists a series of pigments obtained in a good yield and with excellent fastness properties, when the reaction proceeded according to the data of the Example 1 or 2:

| Diarylaminoterephthalic acids | Product | Shade of the pigment obtained |
|---|---|---|
| 1. 2,5-di-(4'-N-methyl-carbonamidophenylamino)-terephthalic acid. | 2,9-di-(N-methyl-carbonamido)-quinacridone. | Red violet. |
| 2. 2,5-di-(4'-N-i-propyl-carbonamidophenylamino)-terephthalic acid. | 2,9-di-(N-i-propyl-carbonamido)-quinacridone. | Red. |
| 3. 2,5-di-(4'-N-i-butyl-carbonamidophenylamino)-terephthalic acid. | 2,9-di-(N-i-butyl-carbonamido)-quinacridone. | Red violet. |

We claim:
1. A linear trans-quinacridone of the formula

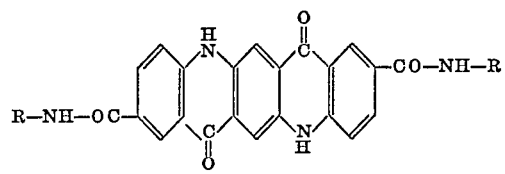

wherein R is an alkyl of 1 to 6 carbon atoms other than ethyl, n-butyl or n-hexyl.

2. A compound of the formula
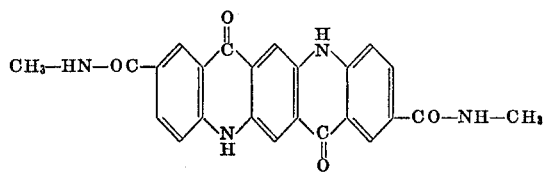
3. A compound of the formula
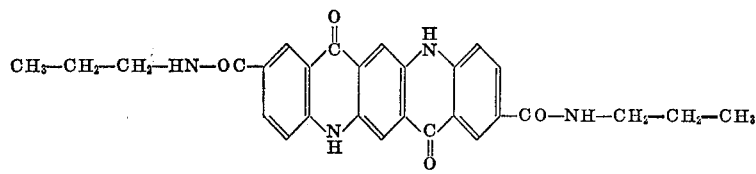
4. A compound of the formula
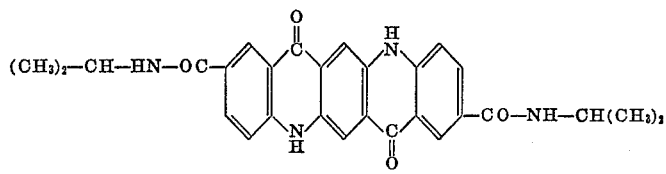
5. The compound of the formula
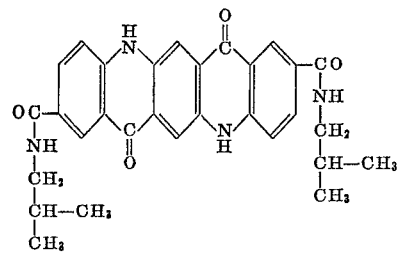
References Cited
UNITED STATES PATENTS
| | | | |
|---|---|---|---|
| 3,045,040 | 7/1962 | Deuschel | 260—471 |
| 3,165,524 | 1/1965 | Schumacher et al. | 260—279 |
| 3,200,122 | 8/1965 | Strelff | 260—279 |
| 3,261,837 | 7/1966 | Bohler | 260—279 |
| 3,264,298 | 8/1966 | Berry et al. | 260—279 |
| 3,530,136 | 9/1970 | Hsia et al. | 260—279 |
FOREIGN PATENTS
| | | | |
|---|---|---|---|
| 413,181 | 12/1966 | Switzerland | 260—279 |
| 419,395 | 3/1967 | Switzerland | 260—279 |
DONALD G. DAUS, Primary Examiner
U.S. Cl. X.R.
106—288 Q; 260—471 A